US012013087B2

(12) United States Patent
Chen et al.

(10) Patent No.: US 12,013,087 B2
(45) Date of Patent: Jun. 18, 2024

(54) LED BULB AND METHOD OF MANUFACTURE

(71) Applicant: LUMILEDS LLC, San Jose, CA (US)

(72) Inventors: Shengjin-Sj Chen, Shanghai (CN); Gao Jie Yu, Shanghai (CN); Qiao Shen, Shanghai (CN); Guang Hu Tang, Shanghai (CN)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 18/015,291

(22) PCT Filed: Jul. 9, 2021

(86) PCT No.: PCT/US2021/041117

§ 371 (c)(1),
(2) Date: Jan. 9, 2023

(87) PCT Pub. No.: WO2022/011280

PCT Pub. Date: Jan. 13, 2022

(65) Prior Publication Data

US 2023/0265979 A1 Aug. 24, 2023

(30) Foreign Application Priority Data

Jul. 9, 2020 (WO) ................ PCT/CN2020/101004
Aug. 6, 2020 (EP) .................................... 20189843

(51) Int. Cl.
*F21K 9/235* (2016.01)
*F21S 41/19* (2018.01)
(Continued)

(52) U.S. Cl.
CPC ............ *F21K 9/235* (2016.08); *F21S 41/192* (2018.01); *F21V 17/14* (2013.01); *F21Y 2107/90* (2016.08)

(58) Field of Classification Search
CPC ....... F21K 9/235; F21S 41/192; F21S 41/194; F21V 17/14; F21Y 2107/90
(Continued)

(56) References Cited

U.S. PATENT DOCUMENTS

| | | | | |
|---|---|---|---|---|
| 4,841,419 A * | 6/1989 | Ohishi | H01R 33/09 | 362/519 |
| 10,598,338 B1 | 3/2020 | Goodwin et al. | | |
| 2016/0053956 A1* | 2/2016 | Toyoyama | F21S 41/162 | 362/548 |

FOREIGN PATENT DOCUMENTS

| | | |
|---|---|---|
| CN | 208107964 U | 11/2018 |
| CN | 208139184 U | 11/2018 |

(Continued)

OTHER PUBLICATIONS

Translation of JP2018078086A (Year: 2018).*
(Continued)

*Primary Examiner* — Laura K Tso
(74) *Attorney, Agent, or Firm* — Volpe Koenig

(57) ABSTRACT

An LED bulb includes a center ring, a burner and an elastic component. The center ring includes a central opening, a first flat rim extending along a first part of an outer edge of the central opening, and a first notch cut-out beyond the central opening at an end of the first flat rim. The burner is disposed at least in part in the central opening and includes a first pin that has a first flat side face. The elastic component is configured to press the first flat rim of the center ring against the first flat side face of the first pin of the burner.

20 Claims, 6 Drawing Sheets

(51) Int. Cl.
*F21V 17/14* (2006.01)
*F21Y 107/90* (2016.01)

(58) Field of Classification Search
USPC .................................................. 362/382, 651
See application file for complete search history.

(56) References Cited

FOREIGN PATENT DOCUMENTS

| | | | |
|---|---|---|---|
| CN | 209569667 | U | 11/2019 |
| DE | 202020101383 | U1 | 3/2020 |
| EP | 3421882 | A1 | 1/2019 |
| EP | 3647649 | A1 | 5/2020 |
| JP | 2005-044777 | A | 2/2005 |
| JP | 2018-078085 | A | 5/2018 |
| JP | 2018-078086 | A | 5/2018 |
| JP | 3218915 | U | 11/2018 |
| KR | 20160101380 | A | 8/2016 |
| KR | 101685650 | B1 | 12/2016 |

OTHER PUBLICATIONS

International Preliminary Report on Patentability Chapter I dated Jan. 10, 2023 for PCT International Application No. PCT/US2021/041117.
Extended European Search Report dated Nov. 17, 2020 for European Patent Application No. 20189843.4.
International Search Report and Written Opinion dated Nov. 1, 2021 for PCT International Application No. PCT/US2021/041117.

* cited by examiner

LED BULB AND METHOD OF MANUFACTURE

CROSS REFERENCE TO RELATED APPLICATIONS

This application is a § 371 application of International Application No. PCT/US2021/041117, filed Jul. 9, 2021, which claims the benefit of PCT Application No. PCT/CN2020/101004, which was filed on Jul. 9, 2020, and European Patent Appln. No. 20189843.4, which was filed on Aug. 6, 2020, the contents of which are hereby incorporated by reference herein.

BACKGROUND

Bulbs, including halogen bulbs and LED bulbs, are widely used in various lighting scenarios, for example in automotive lighting and in indoor lighting. Due to an omnidirectional light emission of halogen, the halogen bulbs can be installed in any direction within the whole lighting module or system, such as within an automotive headlight, and output the same beam pattern.

SUMMARY

An LED bulb includes a center ring, a burner and an elastic component. The center ring includes a central opening, a first flat rim extending along a first part of an outer edge of the central opening, and a first notch cut-out beyond the central opening at an end of the first flat rim. The burner is disposed at least in part in the central opening and includes a first pin that has a first flat side face. The elastic component is configured to press the first flat rim of the center ring against the first flat side face of the first pin of the burner.

BRIEF DESCRIPTION OF THE DRAWINGS

A more detailed understanding can be had from the following description, given by way of example in conjunction with the accompanying drawings wherein.

DETAILED DESCRIPTION

Figure 1:
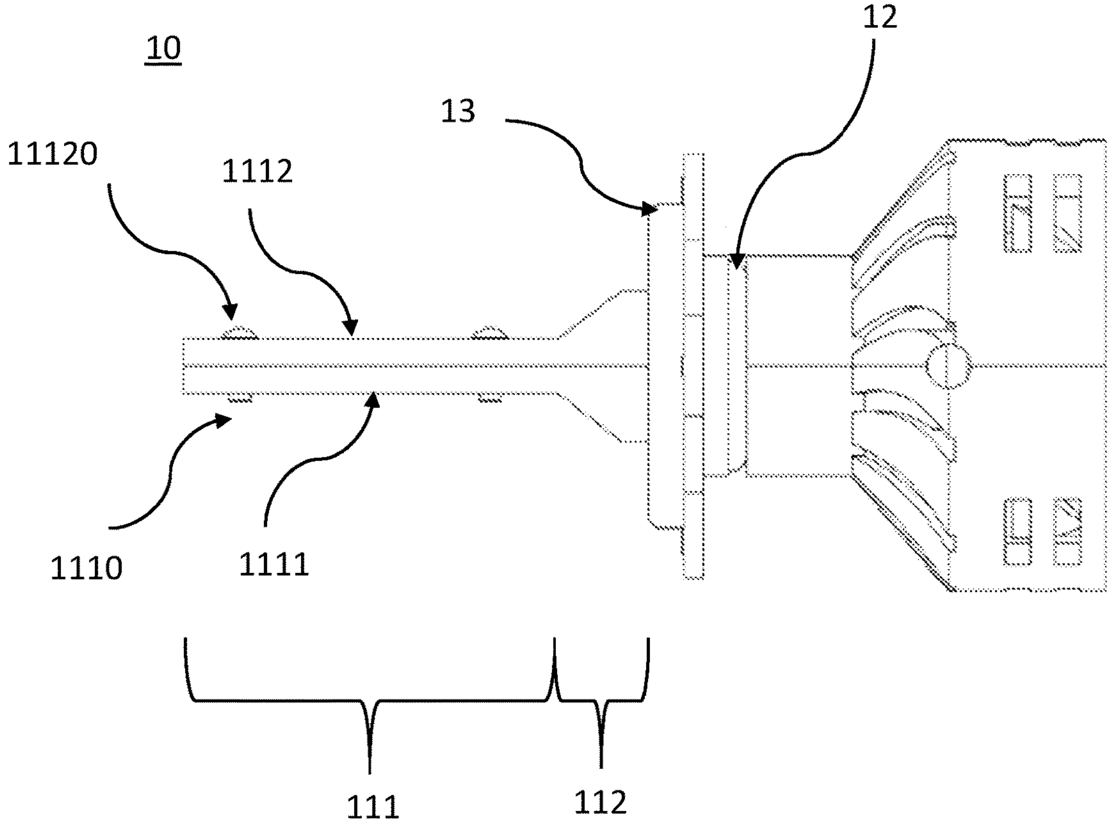
FIG. 1 is a schematic diagram of an example of a fully assembled LED bulb.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

While halogen bulbs can be installed in any direction without changing the output beam pattern, this may not be the case if such halogen bulbs are replaced by LED bulbs because LEDs of the LED bulbs are typically only emitting light across half of the 3D space (e.g., they are side emitting). In this case, at least two LEDs may be required in a conventional LED bulb, located respectively at two opposite sides of the LED bulb's body, helping to get a similar output of light emission as that of the halogen bulbs. In a case that two LEDs are included in a conventional LED bulb, stepped rims comprising discrete steps are often used on the center ring of the LED bulb to obtain an excellent omni-directional beam output as that of the halogen bulbs. In such configurations, pins on the burner of the LED bulb may be configured to rest into valleys between adjacent steps for the assembly of the LED bulb. In this case, only a limited number of angle positions can be reached if the burner is rotated with respect to the center ring of the LED bulb, rendering it to be extremely inconvenient for an end user to install the LED bulb in an optimal rotational position.

Thus, it may be desirable to provide a retrofit LED bulb so as to ensure that the end user can adjust the installing angle of the LED bulb according to the specific requirements of applications or just based on what the end user desires, while still having a perfect light beam output as that of the halogen bulbs and also a nice mechanical resistance for field applications.

Embodiments described herein may provide for an LED bulb with a center ring that has a flat rim with a notch at an end thereof. This flat rim may replace the stepped rim of the center ring in conventional LED bulbs. Thus, in the embodiments described herein, there will be no need to provide the pin of the burner, which is to be pressed against the flat rim of the center ring, with any special curves that were otherwise matched with the valleys between adjacent steps of the stepped rim of the center ring in the conventional LED bulb. This may be beneficial for the easy and cost-effective manufacture of the pin and also of the burner in the LED bulb. Further, after introducing a flat rim in the center ring of the above proposed LED bulb, a continuous angle rotation can be achieved between the burner and the center ring, wherein the burner and the center ring may be able to be kept at any of continuous angle positions relative to each other. This may be easy to operate by an end user as desired. By contrast, by using a conventional LED bulb with a center ring having a stepped rim, comprising, for example, three valleys between adjacent steps, only a limited number of discrete angle positions (e.g., 3) can be reached for the burner with respect to the center ring. Therefore, according to embodiments described herein, a great flexibility can be provided for the end user in installing the LED bulb on a specific automotive vehicle according to the practical requirements, because the relative angle position between the burner and the center ring of the LED bulb may no longer be restricted only to those limited ones determined by the valleys between adjacent steps of the center ring's stepped rim in the conventional LED bulb.

FIG. 1 is a schematic diagram of an example of a fully assembled LED bulb 10. The example LED bulb 10 may be used, for example, in an automotive vehicle. In the example illustrated in FIG. 1, the LED bulb 10 includes a burner 11, an elastic component 12, such as an O-ring 120, and a center ring 13. In the fully assembled LED bulb 10, the burner 11 is inserted through both the elastic component 12 and the center ring 13. For example, when assembling the LED bulb 10, a user may insert the left part of the burner 11 firstly through the elastic component 12 and then through the center ring 13, thus giving the assembled LED bulb 10 like that shown in FIG. 1.

The burner 11 of the LED bulb 10 may include two portions, a first portion 111 and a second portion 112. For example, as shown in FIG. 1, in the LED bulb 10, the first portion 111 of the burner 11 can have a plate shape and the second portion 112 of the burner 11 can have a cylindrical shape with the first portion 111 and the second portion 112 being contiguous to each other at, for example, a right side of the first portion 111 and a left side of the second portion 112. Furthermore, in the example LED bulb 10 of FIG. 1, the first portion 111 of the burner 11 may include a first side 1111 and a second side 1112, shown as upper and lower sides in FIG. 1. At least one first LED 11110 can be provided on the first side 1111, and at least one second LED 11120 can be provided on the second side 1112. The number of first LEDs 11110 and/or second LEDs 11120 is shown to be two in FIG. 1 just for the sake of clarity. A skilled person in the art shall easily understand, however, that any suitable number of first LEDs 11110 and/or second LEDs 11120 can be provided on the first side 1111 and/or second side 1112 of the burner 10 within the scope of the embodiments described herein.

Figure 2:
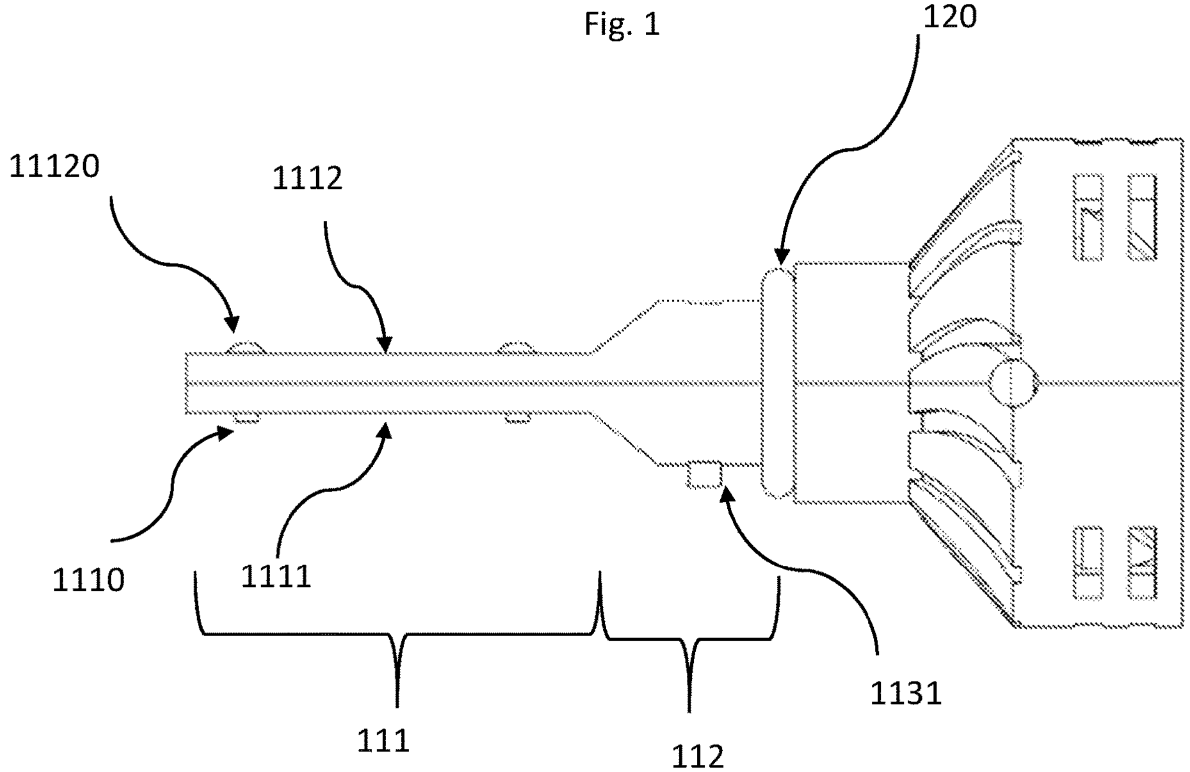
FIG. 2 is a schematic diagram of a specific example of the LED bulb of FIG. 1 partially assembled to show the burner and an elastic O-ring.
Figure 3A:
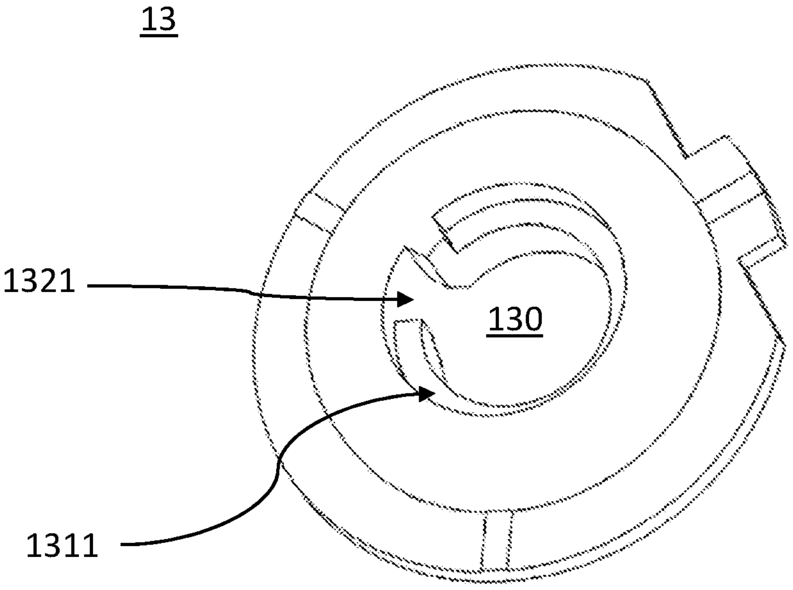
FIG. 3A is a schematic diagram of the center ring of the example LED bulb of FIG. 1.
Figure 3B:
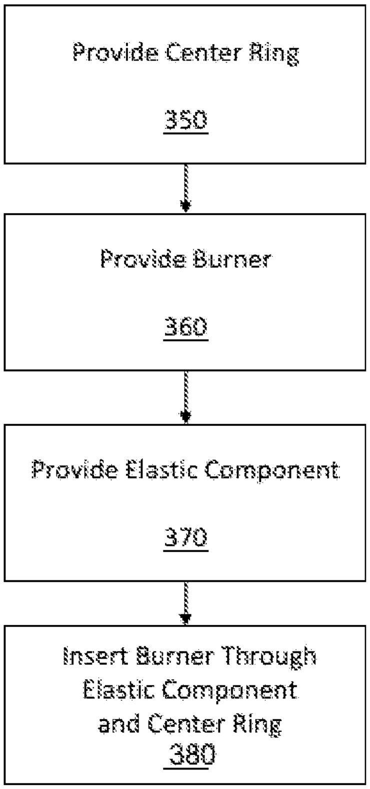
FIG. 3B is a flow diagram of a method of assembling an LED bulb.

FIG. 2 is a schematic diagram of a specific example of the LED bulb of FIG. 1 partially assembled to show the burner and an elastic O-ring. FIG. 3A is a schematic diagram of the center ring of the example LED bulb of FIG. 1. FIG. 3B is a flow diagram of a method of assembling an LED bulb. As similar to the above description of FIG. 1, in the LED bulb 10 of FIG. 2, the burner 11 has been inserted through the elastic O-ring 120. As seen in FIG. 2 as well, the burner 11 comprises a first portion 111 that has a plate shape and a second portion 112 that has a cylindrical shape. The first portion 111 may include a first side 1111 (the lower side in the drawing) provided with two first LEDs 11110 and a second side 1112 (the upper side in the drawing) provided with two second LEDs 11120. As shown in FIG. 2, for example, the first pin 1131 of the burner 11 can have a cuboid shape (e.g., comprising at least flat side faces).

Where the first pin 1131 of the burner 11 has flat side surfaces, once the LED bulb is assembled, the contact interface between the first pin and the first flat rim may be flat, thus being advantageous to the durable use of the pin (thus of the burner) and also of the flat rim (thus of the center ring). Besides, a perfect fitting with a higher accuracy or a nearly zero tolerance may be much easier to obtain between the first flat surface of the first pin and the first flat rim, as compared to that between two curved surfaces. This, on one hand, may render installation and rotation of the burner and the center ring in the LED bulb to be more accurate, and on the other hand, may help to increase the vibration resistance of the burner and the center ring in the LED bulb. Further, due to the flat contact interface between the first pin and the first flat rim as well, the pressure applied by the elastic component on the first flat rim of the center ring against the first pin of the burner may be ensured to be large enough, such that the center ring may be fixed firmly against the burner, thus providing the LED bulb with a high mechanical stability. In some embodiments, the first pin of the burner may have a cuboid shape, which may be easy and cost-effective to manufacture.

A method of assembling an LED bulb will now be explained in detail with reference to FIGS. 3A and 3B. In the example method illustrated in FIG. 3B, a center ring is provided (350). As shown in FIG. 3A, the center ring 13 may comprise a central opening 130 and a first notch 1321. The first notch 1321 may be cut-out beyond the center opening 130 at a certain point along an outer edge of the center opening 130. The center ring 13 may also include a flat rim or first flat rim 1311. The flat rim or first flat rim 1311 may extend at least partly along an outer edge of the center opening 130. In embodiments, the flat rim or first flat rim 1311 may extend along a first part of the outer edge (for example, along most of the outer edge in the drawing). In the example illustrated in FIG. 3A, for example, the first notch 1321 is located at one end of the first flat rim 1311 (for example, the starting and end in the drawing).

The method may also include providing a burner that includes a first pin (360) and providing an elastic component (370). The burner may be inserted through the elastic component and the central opening in the center ring (380). In the illustrated examples, if the half-assembled LED bulb, such as shown in FIG. 2 and already comprising the burner inserted through the elastic O-ring 120, is assembled further by inserting the burner through the center ring 13 shown in FIG. 3A, the first pin 1131 on the second portion 112 of the burner 11 may pass through the first notch 1321 of the center ring 13 first and then get pressed against the first flat rim

1311 (e.g., the upper face thereof) by the elastic O-ring 120 after, for example, a slight rotation of the center ring 13 with respect to the burner 11.

As described above, the first pin 1131 can have a cuboid shape and include, for example, a flat side face. Thus, the contacting interface between the first pin 1131 and the first flat rim 1311, which may be pressed against each other by the O-ring 120 after assembly of the LED bulb 10, may be flat as well, rendering the further rotation of the first pin 1131 (thus of the burner 11) along the first flat rim 1311 (thus along the center ring 13) to be continuous and stable. This may help to obtain not only a continuous relative rotation between the burner 11 and the center ring 13 but also a reliable mechanical performance of the LED bulb 10 as assembled, thus being well distinguished from an LED bulb having a center ring with a stepped rim and a burner having a pin with a curved or round side face, such as shown, for example, in FIGS. 4 and 5.

Figure 4:
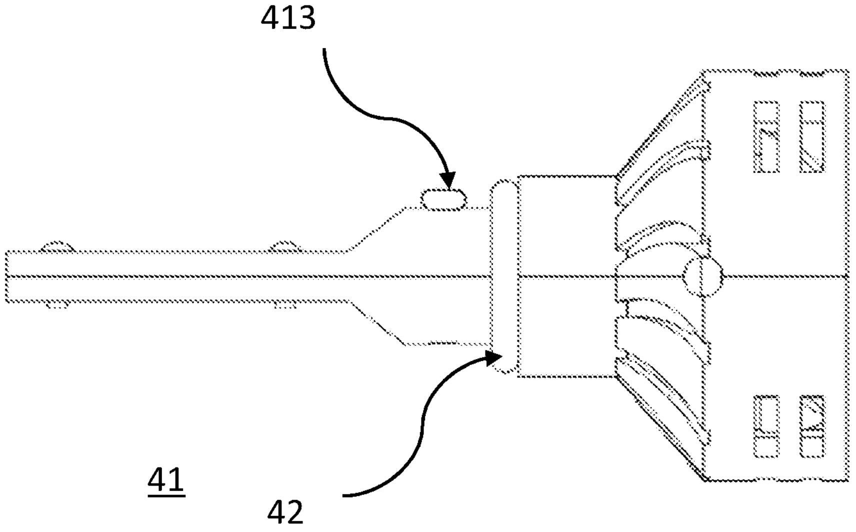
FIG. 4 is a schematic diagram of a partially assembled LED bulb showing a burner with a pin having a curved or round side face and an O-ring.
Figure 5:
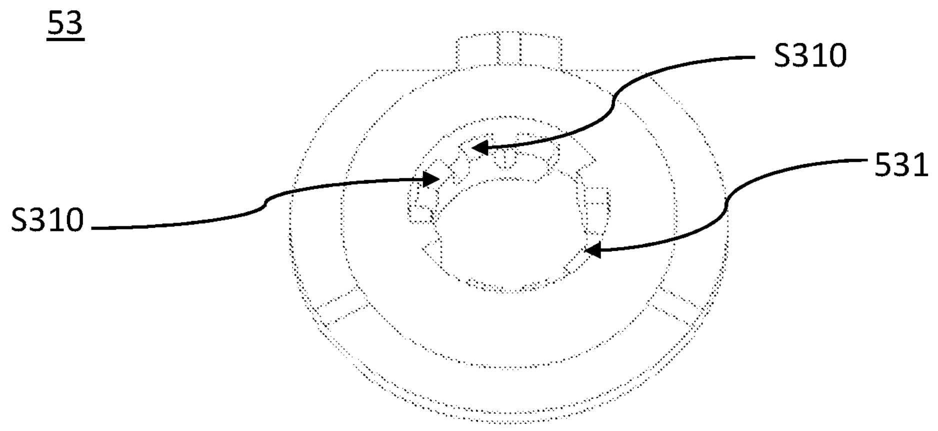
FIG. 5 is a schematic diagram of a center ring having a stepped rim to be used for assembly with the partially assembled LED bulb of FIG. 4.

FIG. 4 is a schematic diagram of a partially assembled LED bulb showing a burner with a pin having a curved or round side face and an O-ring. FIG. 5 is a schematic diagram of a center ring having a stepped rim to be used for assembly with the partially assembled LED bulb of FIG. 4. As can be seen in FIG. 5, the center ring 53 comprises a stepped rim 531 instead of a flat one, where several distinct steps S310 (such as three) are separated by the respective one of the valleys therebetween. In this case, the corresponding pin 413 on the burner 41 shown in FIG. 4 is shaped to have at least a curved or round side face, which may be pressed against the respective valley between adjacent steps S310 of the stepped rim 531 in the center ring 53 so that the burner 41 and the center ring 53 are fixed firmly by means of the O-ring 42.

As can be seen from FIG. 4 and FIG. 5, the round pin 413 can be only pressed against the respective valley between adjacent steps S310 of the stepped rim 531 in the center ring 53. In this case, if the user rotates the burner 41 with respect to the center ring 53 to change the installing angle of the LED bulb, only three positions can be reached, each corresponding to a valley with the round pin 413 rested therein. Thus, only a limited number of distinct orientations can be obtained. In other words, there is no way to rotate the burner 41 continuously with respect to the center ring 53 having the stepped rim 531, which causes a lot of inconvenience for practical applications.

Further, as shown in FIG. 4 and FIG. 5 as well, a side face of the round pin 413 may be curved or round so as to fit and contact the respective recessed valley between adjacent steps S310 of the stepped rim 531 after assembly of the LED bulb. This not only goes against the easy and cost-effective manufacture of the pin 413 and, thus, of the burner 41, but also may result in a severe wear of the pin 413 and the respective stepped rim 531. Furthermore, the curved or round interface between the pin 413 and the stepped rim 531 also tends to show a poor vibration resistance, because a clearance appears easily between two curved or round surfaces touching each other, leading to an easy loose after vibration. All these disadvantages can be eliminated perfectly or at least alleviated by the retrofit LED bulb described herein, wherein a flat rim is introduced on the center ring to replace the stepped one, and furthermore, a pin having a flat side face to be in contact with the flat rim of the center ring may be used on the burner.

Figure 6:
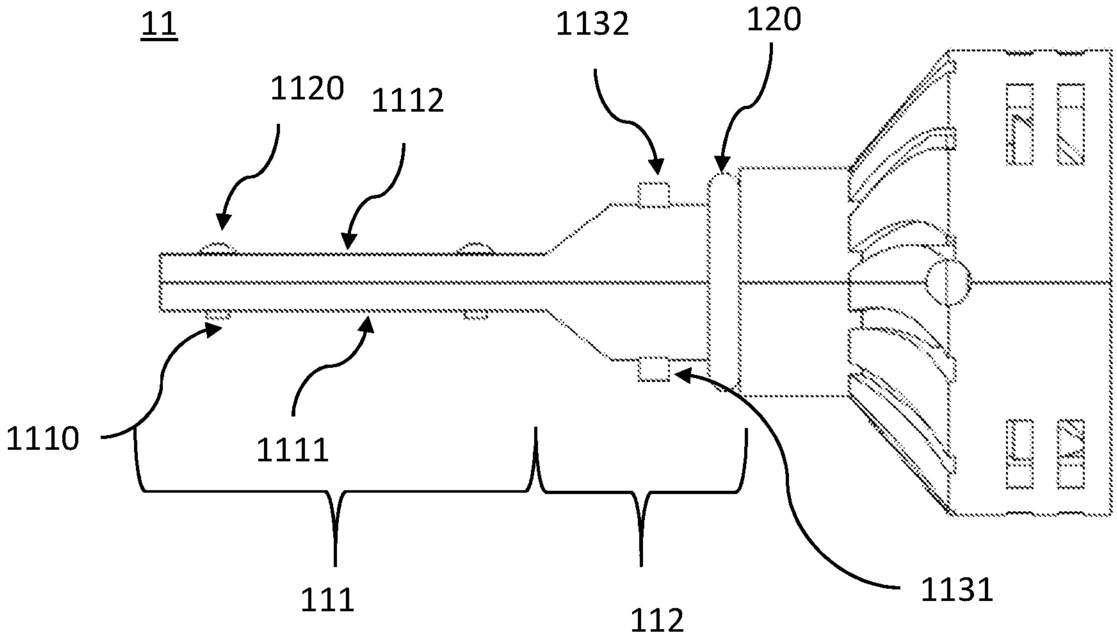
FIG. 6 is a schematic diagram of another example of an LED bulb partially assembled to show the burner and an elastic O-ring.
Figure 7:
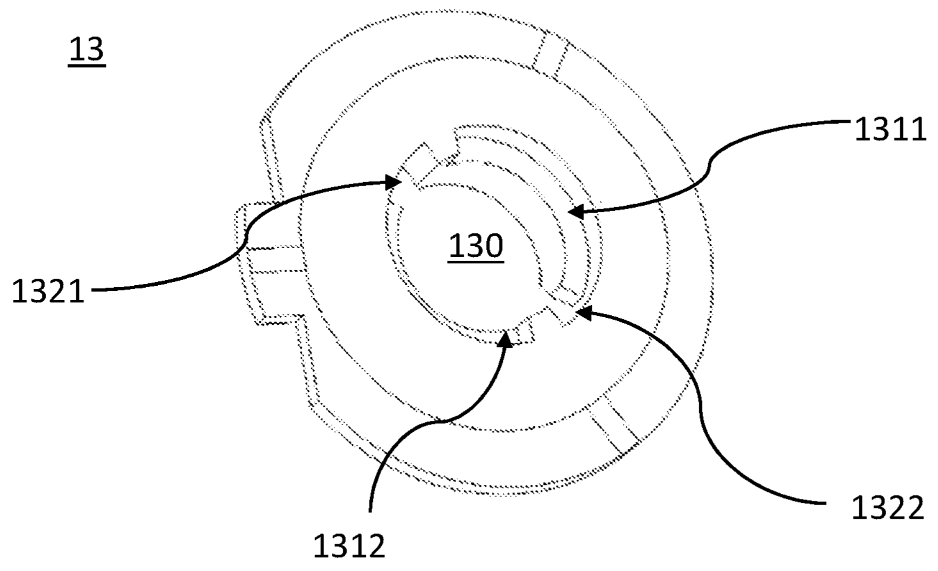
FIG. 7 is a schematic diagram of a center ring of the example LED bulb of FIG. 6.

FIG. 6 is a schematic diagram of another example of an LED bulb partially assembled to show the burner and an elastic O-ring. FIG. 7 is a schematic diagram of a center ring of the example LED bulb of FIG. 6. As shown in FIG. 6, the burner 11 has been inserted through the elastic O-ring 120 to obtain a half-assembled LED bulb. Like the burner 11 of FIG. 2, the burner 11 of FIG. 6 also comprises a first portion 111 with a first side 1111 and a second side 1112 and a second portion 112 provided with a first pin 1131. The first side 1111 of the first portion 111 may be provided with two first LEDs 11110 and the second side 1112 of the first portion 111 may be provided with two second LEDs 1112. The difference is that now in FIG. 6, there is another, second pin 1132 opposite the first pin 1131 on the second portion 112 of the burner 11. In this case, the center ring 13 of the LED bulb may comprise a center opening 130, a first flat rim 1311, a second flat rim 1312 opposite the first flat rim 1311, a first notch 1321, and a second notch 1322 opposite the first notch 1321.

When the half-assembled LED comprising the burner 11 and the O-ring 120 of FIG. 6 is inserted through the center opening 130 of the center ring 13 shown in FIG. 7, the first pin 1131 and the second pin 1132 may pass through the first notch 1321 and the second notch 1322 respectively, and, after a slight rotation of the burner 11 relative to the center ring 13, for example, the two pins 1131, 1132 may rest on the respective first and second flat rims 1311, 1312. In this case, under the pressure of elastic O-ring 120, the first pin 1131 and the second pin 1132, one or both of which may have a cuboid shape having a flat side face, may be kept firmly against the respective first and second flat rims 1311, 1312, rendering the final assembled LED bulb to be compact and stable.

In the examples illustrated in FIGS. 6 and 7, a second pair of components (e.g., the second pin 1132 and the second flat rim 1312) are introduced further onto the LED bulb, which may enable the elastic O-ring 120 to apply a larger (for example, a doubled) pressure of the burner 11 against the center ring 13, helping to provide the final assembled LED bulb with a more stable performance in mechanics and also electrics, in addition to the continuous angle rotation between the burner 11 and the center ring 13 described above. Besides, according to an example instance of this embodiment, the first and second sides 1111, 1112 of the plate-shaped first portion 111 of the burner 11 may both be provided with LEDs, which may render an omni-directional emission of light to be possible, thus being beneficial for practical applications.

Additionally, where two pins, such as the first pin and the second pin, are positioned directly opposite to each other on the second portion of the burner, the two notches, such as the first notch and the second notch, will be necessarily located opposite to each other on the center ring. This may result in both of the first flat rim and the second flat rim extending between the first notch and the second notch on the center ring but along two different parts of the outer edge of the center opening. For example, the outer edge of the center opening may include two half parts, both extending between the first notch and the second notch, wherein the first flat rim may extend along one half part and the second flat rim may extend along the other half part.

Figure 8:
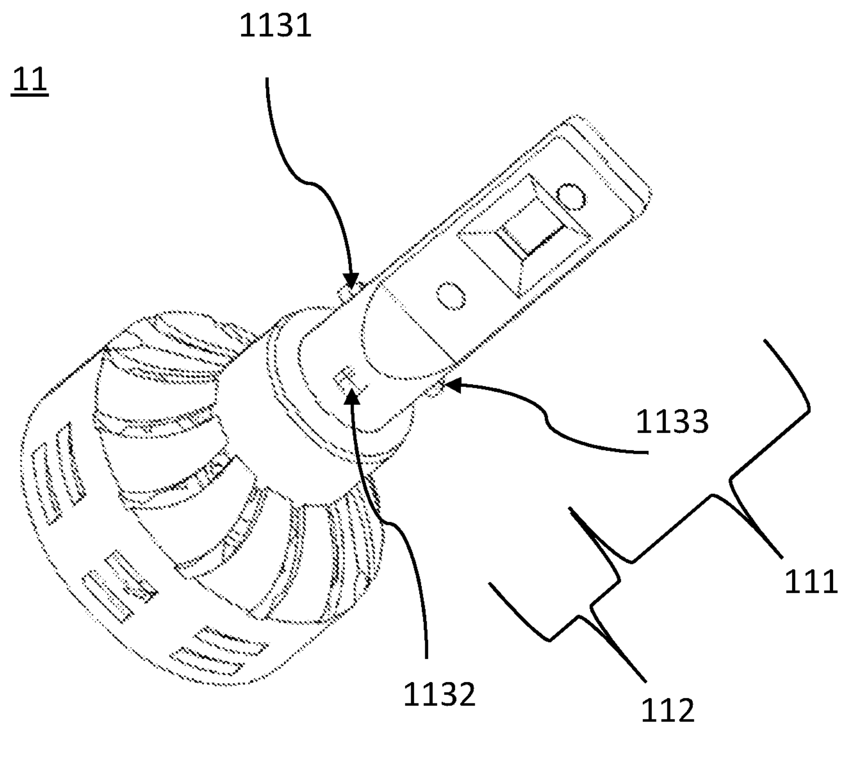
FIG. 8 is a schematic diagram of another example of an LED bulb partially assembled to show the burner and an elastic O-ring.
Figure 9:
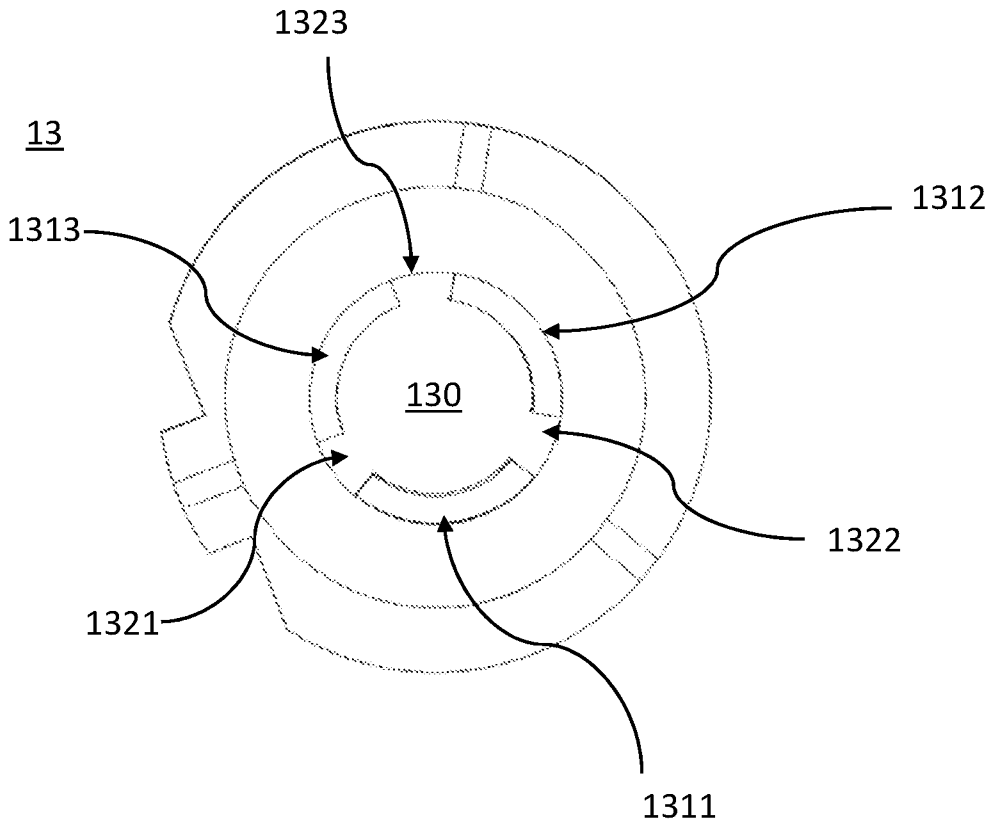
FIG. 9 is a schematic diagram of a center ring of the example LED bulb of FIG. 8.

FIG. 8 is a schematic diagram of another example of an LED bulb partially assembled to show the burner and an elastic O-ring. FIG. 9 is a schematic diagram of a center ring of the example LED bulb of FIG. 8. As shown in FIG. 8, the burner 11 has been inserted through the elastic O-ring 120 to obtain a half-assembled LED bulb. Like the burner 11 of FIG. 6, the burner 11 in FIG. 8 comprises a first portion 111 and a second portion 112 having a first pin 1131 and a second pin 1132 provided thereon. Besides, as similar to FIG. 6, the first side 1111 and the second side 1112 of the burner 11 can be provided with LEDs as well, which is not illustrated herein for the sake of clarity. The difference is that now in FIG. 8, there is also a third pin 1133 of the burner 11.

In embodiments, the first pin 1131, the second pin 1132, and the third pin 1133 can be positioned at an equal distance (e.g., uniformly spaced apart) on the second portion 112 of the burner 11. In this case, the respective center ring 13 may comprise a center opening 130, a first flat rim 1311, a second flat rim 1312, a third flat rim 1313, a first notch 1321, a second notch 1322, and a third notch 1323. Where the three pins (e.g., the first pin, the second pin, and the third pin) are positioned with an equal distance on the second portion of the burner, the three notches (e.g., the first notch, the second notch, and the third notch) may be located at three uniformly spaced positions respectively along the outer edge of the center opening of the center ring. For example, in the center ring of the LED bulb, the outer edge of the center opening may be divided into three equal parts (e.g., the first part, the second part, and the third part) by the three notches (e.g., the first notch, the second notch and the third notch), wherein the first flat rim may extend along the first part between the first notch and the second notch, the second flat rim may extend along the second part between the second notch and the third notch, while the third flat rim may extend along the third part between the third notch and the first notch.

When the half-assembled LED comprising the burner 11 and the O-ring 120 of FIG. 8 is inserted further through the center opening 130 of the center ring 13 shown in FIG. 9, the first pin 1131, the second pin 1132, and the third pin 1133 may pass through the first notch 1321, the second notch 1322, and the third notch 1323 respectively. Again, for example, after a slight rotation of the burner 11 relative to the center ring 13, the three pins 1131, 1132, 1133 may rest on the respective first, second and third flat rims 1311, 1312, 1313 of the center ring 13. In the end, under the pressure of O-ring 120, the first pin 1131, the second pin 1132, and the third pin 1133, one or more of which may have a cuboid shape having a flat side face, may all be kept firmly against the respective first, second and third flat rims 1311, 1312, 1313, helping to provide a firm fixation between the burner 11 and the center ring 13.

As explained above, in the LED bulb described above with respect to FIGS. 8 and 9, a further third pair of components (e.g., the third pin 1133 and the third flat rim 1313) is incorporated, which may render the elastic O-ring 120 capable of applying an even larger (for example, triple) pressure of the burner 11 against the center ring 13. Again, not only the continuous angle rotation between the burner 11 and the center ring 13 can be achieved like the description above but also the assembled LED bulb can be provided with a more stable performance in mechanics and electrics. Besides, as stated above, according to an example embodiment, in the proposed LED bulb, the first and second sides 1111, 1112 of the first portion 111 of the burner 11 may all be provided with LEDs, helping to give an omni-directional emission of light output, thus being beneficial for practical applications. In embodiments, LEDs can be disposed uniformly on the respective side of the first portion of the burner.

According to an example embodiment, in any of the LED bulbs described herein, the center ring can be made by injection molding using one of the following materials: Polyphenylene Sulfide (PPS), Polyvinyl Toluene (PVT), Polyamide 6, 6 (PA66), Polyamide 4, 6 (PA46), Liquid Crystal Polymer (LCP), Polyether Ether Ketone (PEEK), and Polyphthalamide (PPA). Those skilled in the art shall easily understand that all the above materials are merely listed as possible candidates for manufacturing the center ring but are not meant to place a restriction on the embodiments described herein. Other suitable materials, such as metal or plastic, can be used as well. A similar reasoning applies to the manufacture process, for example injection molding, as well, because a skilled person in the art shall appreciate that other suitable processes, such as die casting and stamping, can be also used consistent with the embodiments described herein.

According to another example embodiment, in the above described LED bulb embodiments, the first flat surface of the first pin and a surface of the first flat rim contacting the first flat surface of the first pin once the LED bulb is assembled, may be formed from a first material with a first frictional resistance high enough to resist an unintentional sliding along each other. Similarly, the second flat surface of the second pin, and a surface of the second flat rim contacting the second flat surface of the second pin when the LED bulb is assembled may be formed from a second material with a second frictional resistance high enough to resist an unintentional sliding along each other. Similarly, the third flat surface of the third pin and a surface of the third flat rim contacting the third flat surface of the third pin when the LED bulb is assembled may be made of a third material with a third frictional resistance high enough to resist an unintentional sliding along each other. In more specific embodiments, at least one of the first material, the second material, and the third material may be Polyphenylene Sulfide (PPS). In this way, the constituent components, such as the burner and the center ring, can be well fixed with respect to each other, helping to avoid or substantially reduce any unintentional sliding of the three pins along the respective flat rims by the high frictional resistance therebetween and provide the final assembled LED bulb with higher stability in mechanics and further electrics.

It should be noted that, for the sake of clarity, all the above description about a LED bulb is merely focused on the mechanical components in structure and little or nothing is ever talked about the electrical parts of the LED bulb. However, this is not meant to be limiting on the embodiments described herein. As a matter of fact, having benefitted from the embodiments described herein, a skilled person in the art shall easily understand that, apart from those mechanical parts as described above, the LED bulb described herein may comprise all the necessary electrical components as well, such as PCB(s), electrical wires, driving circuits for LEDs, etc., and all these alternatives shall be covered within the protection scope of the embodiments described herein.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. An LED bulb comprising:

an elastic component;

a center ring comprising:

a first surface in contact with the elastic component and a second surface opposite the first surface, a central opening, a flat rim extending along a first part of an outer edge of the central opening and having a first flat surface that is coplanar with the first surface and recessed from the first surface, and a first notch cut-out formed in the flat rim; and a burner disposed at least in part in the central opening and comprising a first pin that has a first flat side face, the elastic component configured to press the first flat surface of the first flat rim of the center ring against the first flat side face of the first pin of the burner.

2. The LED bulb according to claim 1, wherein the first pin has a cuboid shape.

3. The LED bulb according to claim 1, wherein the first notch cut-out is configured to allow the first pin of the burner to pass through on insertion of the burner into the central opening.

4. The LED bulb according to claim 1, wherein the elastic component is configured to press the first flat surface of the flat rim of the center ring against the first flat surface of the first pin such that an unintentional rotation between the burner and the center ring is inhibited.

5. The LED bulb according to claim 1, wherein:

the burner further comprises a second pin, the center ring further comprises a second notch cut-out formed in the flat rim, wherein the first notch cut-out and the second notch cut-out divide the flat rim into a first flat rim and a second flat rim and the elastic component is further configured to press the second flat rim of the center ring against the second pin of the burner.

6. The LED bulb according to claim 5, wherein the second pin comprises a second flat surface contacting the second flat rim on assembly of the LED bulb.

7. The LED bulb according to claim 5, wherein:

the burner comprises a first portion in shape of a plate and a second portion in shape of a cylinder, the first portion comprises a first side provided with at least one first LED and a second side, opposite to the first side, provided with at least one second LED, the first pin is positioned opposite the second pin on the second portion, and the second notch cut-out is positioned opposite the first notch cut-out.

8. The LED bulb according to claim 5, wherein:

the burner further comprises a third pin, the center ring further comprises a third notch cut-out formed in the flat rim, wherein the third notch cut-out further divides the flat rim into a third-flat rim, and the elastic component is further configured to press the third flat rim of the center ring against the third pin of the burner.

9. The LED bulb according to claim 8, wherein the third pin comprises a third flat surface contacting the third flat rim on assembly of the LED bulb.

10. The LED bulb according to claim 8, wherein:

the burner comprises a first portion in shape of a plate and a second portion in shape of a cylinder, the first portion comprises a first side provided with at least one first LED and a second side, opposite to the first side, provided with at least one second LED, the first pin is positioned opposite the second pin on the second portion, the second notch cut-out is positioned opposite to the first notch cut-out, and the first pin, the second pin, and the third pin are uniformly spaced on the second portion of the burner.

11. The LED bulb according to claim 8, wherein at least one of the first pin, the second pin, and the third pin has a cuboid shape.

12. The LED bulb according to claim 1, wherein the center ring is formed from at least one of Polyphenylene Sulfide (PPS), Polyvinyl Toluene (PVT), Polyamide 6, 6 (PA66), Polyamide 4, 6 (PA46), Liquid Crystal Polymer (LCP), Polyether Ether Ketone (PEEK), and Polyphthalamide (PPA).

13. The LED bulb according to claim 1, wherein the first flat surface of the first pin and a surface of the first flat rim contacting the first flat surface of the first pin are formed from a first material with a first frictional resistance high enough to resist an unintentional sliding along each other.

14. The LED bulb according to claim 6, wherein the second flat surface of the second pin and a surface of the second flat rim contacting the second flat surface of the second pin are formed from a second material with a second frictional resistance high enough to resist an unintentional sliding along each other.

15. The LED bulb according to claim 9, wherein the third flat surface of the third pin and a surface of the third flat rim contacting the third flat surface of the third pin on assembly of the LED bulb are formed from a third material with a third frictional resistance high enough to resist an unintentional sliding along each other.

16. The LED bulb according to claim 13, wherein the first material is Polyphenylene Sulfide (PPS).

17. The LED bulb according to claim 14, wherein the second material is Polyphenylene Sulfide (PPS).

18. The bulb according to claim 15, wherein the elastic component is an O-ring.

19. An LED bulb comprising:

an elastic component;

a center ring comprising:

a first surface in contact with the elastic component and a second surface opposite the first surface, a central opening, a flat rim extending along a first part of an outer edge of the central opening and having a flat surface that is coplanar with the first surface and recessed from the first surface, and a notch cut-out formed in the flat rim;

a burner disposed at least in part in the central opening and comprising a pin that has a flat side face; and a plurality of light-emitting diodes (LEDs), at least two of the plurality of LEDs disposed on opposite faces of a portion of the burner, the elastic component configured to press the flat surface of the flat rim of the center ring against the pin of the burner.

20. A method of manufacturing an LED bulb, the method comprising:

providing an elastic component;

providing a center ring, wherein the center ring comprises:

a first surface in contact with the elastic component and a second surface opposite the first surface, a central opening, a flat rim extending along a first part of an outer edge of the central opening and having a flat surface that is coplanar with the first surface and recessed from the first surface, and a notch cut-out formed in the flat rim;

providing a burner comprising a pin that has a flat side face; and inserting the burner through the elastic component and the central opening in the center ring such that the pin of the burner passes through the notch cut-out upon insertion and the elastic component presses the flat surface of the flat rim of the center ring against the flat side face of the pin of the burner such that an unintentional rotation between the burner and the center ring is inhibited.

* * * * *